(No Model.)   C. E. TIDBLAD.   2 Sheets—Sheet 1.
VALVE GEAR.

No. 482,399.   Patented Sept. 13, 1892.

Witnesses.
Lauritz N. Möller
Alice A. Perkins

Inventor.
Carl E. Tidblad
by Alvan Sudrew
his atty.

(No Model.)  2 Sheets—Sheet 2.

C. E. TIDBLAD.
VALVE GEAR.

No. 482,399. Patented Sept. 13, 1892.

Witnesses.
Lauritz N. Möller.
Alice A. Perkins.

Inventor.
Carl E. Tidblad
by Alban Andrén
his atty.

UNITED STATES PATENT OFFICE.

CARL E. TIDBLAD, OF JAMAICA PLAIN, MASSACHUSETTS.

VALVE-GEAR.

SPECIFICATION forming part of Letters Patent No. 482,399, dated September 13, 1892.

Application filed January 6, 1892. Serial No. 417,169. (No model.)

*To all whom it may concern:*

Be it known that I, CARL E. TIDBLAD, a citizen of Sweden, and a resident of Jamaica Plain, in the county of Suffolk and State of Massachusetts, have invented new and useful Improvements in Valve-Gears, of which the following, taken in connection with the accompanying drawings, is a specification.

This invention relates to improvements in valve-gear for steam-engines, and it is especially well adapted for locomotive-engines, although it may to advantage be used on other kinds of engines, as may be desired.

The object of my invention is to cut off the steam in the steam-cylinder quickly during the early part of the stroke, and to retain a comparative large valve-opening until the steam is cut off, so as to obtain the best and most practical results of such early cut-off. An early cut-off may be accomplished by an eccentric on the crank-shaft; but such eccentric requires to be made exceedingly large for such purpose, and is therefore impractical on locomotive-engines. With the ordinary eccentric valve-gear it is not practical to use an early cut-off, because the valve-opening is reduced in size too rapidly, thereby preventing the free admission of sufficient steam to obtain the best results of the cut-off.

My improved valve-gear is positive in its motion, and it requires a much smaller eccentric as compared with devices operated by direct eccentrics, as will hereinafter be more fully shown and described, reference being had to the accompanying drawings, wherein—

Figure 1:
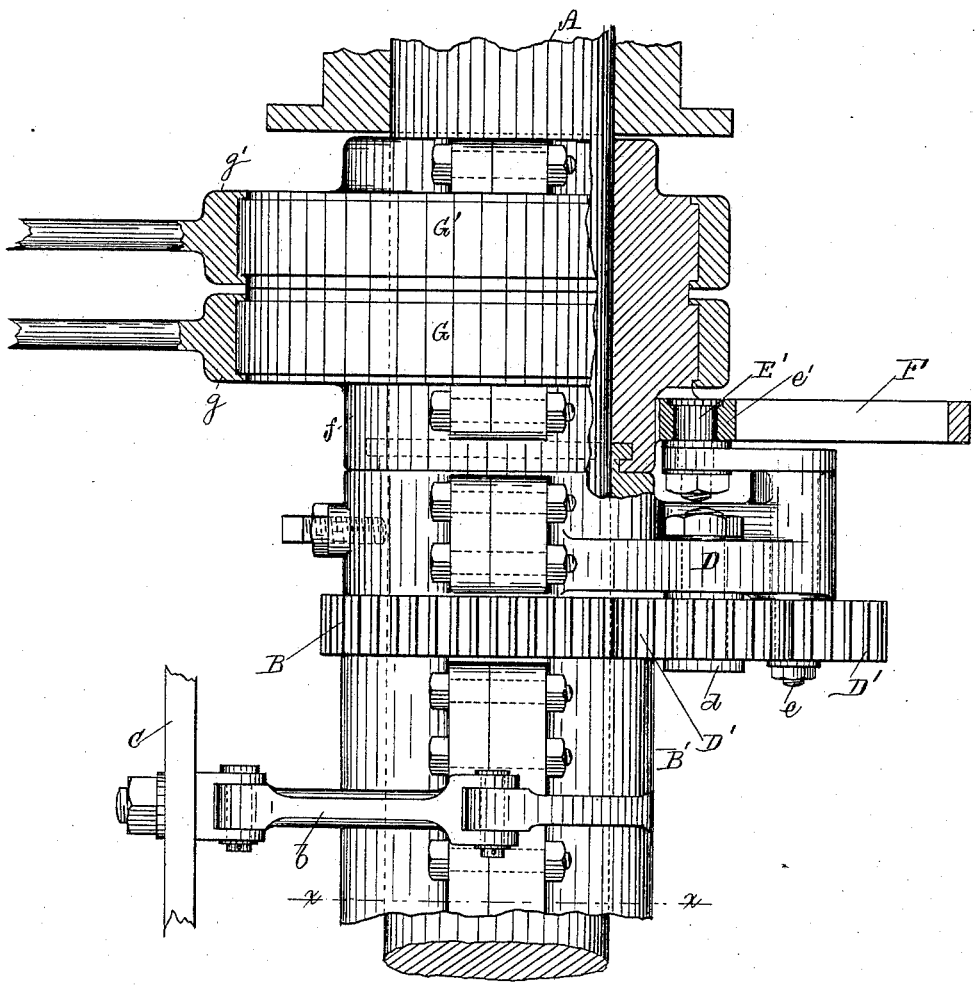
Figure 2:
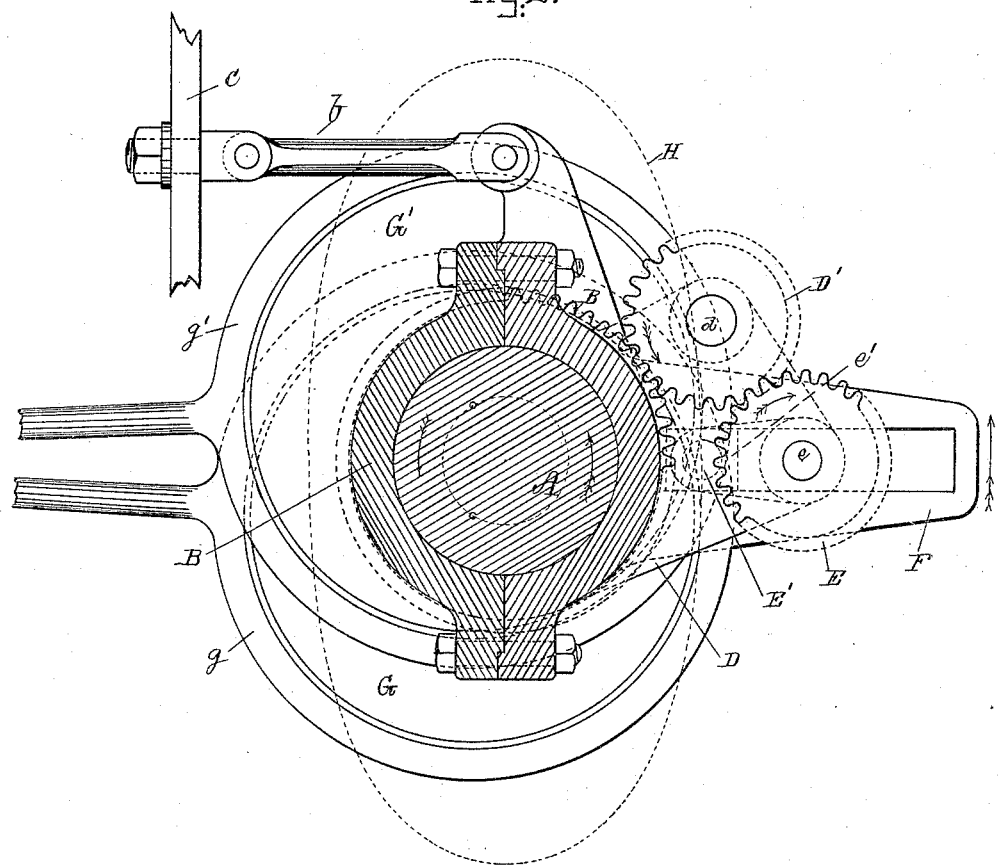

Figure 1 represents a plan view of the improved valve-gear, partly shown in section; and Fig. 2 represents a cross-section on the line X X shown in Fig. 1.

Similar letters refer to similar parts wherever they occur on the differents parts of the drawings.

In the drawings, A is the ordinary rotary crank-shaft of a locomotive or other engine, and B is a stationary gear loosely journaled on said shaft and prevented from rotation by having its hub B' secured to any stationary part of the engine-frame C.

On locomotives where the framework is supported on springs I prefer to secure the hub B' to such frame C by means of a link b, pivoted to B' and frame C, so as to allow the frame to yield up and down relative to the axle A and still hold the hub B' and its gear B from turning. I wish, however, not to confine myself to any particular means for holding the gear B stationary relative to the axle A, as this may be done in any suitable manner, according to the nature and construction of the engine on which the improved valve-gear is to be used.

To the shaft A is secured in any suitable manner an arm or radial projection D, having secured to it a stud or pin d, on which is loosely journaled an intermediate pinion D', the teeth of which mesh in the teeth of the stationary gear B, as shown in the drawings. The teeth of the intermediate pinion D' mesh in the teeth of the pinion E, which is secured to a pin or shaft e, journaled in the outer end of the arm or projection D, as shown. The gear B has exactly twice as many teeth as the pinion E, to which it is geared by means of the intermediate pinion D'.

To one end of the pin or shaft e is secured a crank E', preferably provided with a block e', which is guided in a slotted arm F, which forms a radial extension of a hub or ring f, that is loosely journaled on the shaft A, as shown.

G and G' are eccentrics loosely journaled on the shaft A and secured to or made in one piece with the hub f and its radial arm F, as shown.

g and g' are the eccentric-straps, which surround the respective eccentrics G and G' and are connected in any well-known manner to the slide-valve on the steam-cylinder, such valve connection being, however, not shown in the drawings, as it does not form subject-matter of my invention.

The operation of the invention is as follows: As the crank-shaft A and its arm D is being rotated in the direction shown by arrow in Fig. 2, it causes a rotary motion to be imparted to the pinion E in an opposite direction, as shown by the arrow on said pinion in Fig. 2, and during one complete revolution of said shaft A the pinion E will be rotated two revolutions. During the rotation of the crank-shaft A a variable rotary motion will be given to the eccentrics G G' by the crank E', working in the slotted arm F and carrying the latter with it. During one revolution of the crank-shaft A the axis of the crank E' is moved in the path of a true ellipse H, as shown in Fig. 2, by which an irregular rotary motion is imparted to the eccentrics G G', which is variable from that of the continuous rotary motion of the shaft A. Thus during each one-fourth of the rotation of the shaft A the motion of the eccentrics is alternately accelerated and retarded relative to the rotation of said shaft A, by which the desired results are obtained.

Having thus fully described the nature, construction, and operation of my invention, I wish to secure by Letters Patent and claim—

The improved valve-gear as described, consisting, in combination with a rotating shaft and a stationary gear arranged on said shaft, of an arm secured to the latter and having a pinion meshing in the stationary gear, and a crank connected to said pinion and adapted to actuate an arm loosely journaled on the rotary shaft and connected to one or more eccentrics, substantially as and for the purpose set forth.

In testimony whereof I have signed my name to this specification, in the presence of two subscribing witnesses, on this 12th day of December, A. D. 1891.

CARL E. TIDBLAD.

Witnesses:
ALBAN ANDRÉN,
ALICE A. PERKINS.